(12) United States Patent
Siomina et al.

(10) Patent No.: US 11,165,532 B2
(45) Date of Patent: Nov. 2, 2021

(54) CONTROLLING THE IMPACT OF SRS SWITCHING ON UPLINK TRANSMISSIONS

(71) Applicant: TELEFONAKTIEBOLAGET LM ERICSSON (PUBL), Stockholm (SE)

(72) Inventors: Iana Siomina, Täby (SE); Muhammad Kazmi, Sundbyberg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/346,024

(22) PCT Filed: Nov. 2, 2017

(86) PCT No.: PCT/IB2017/056835
§ 371 (c)(1),
(2) Date: Apr. 29, 2019

(87) PCT Pub. No.: WO2018/083630
PCT Pub. Date: May 11, 2018

(65) Prior Publication Data
US 2019/0245649 A1    Aug. 8, 2019

Related U.S. Application Data

(60) Provisional application No. 62/416,411, filed on Nov. 2, 2016.

(51) Int. Cl.
*H04L 1/00* (2006.01)
*H04W 24/10* (2009.01)
(Continued)

(52) U.S. Cl.
CPC ......... *H04L 1/0026* (2013.01); *H04B 17/104* (2015.01); *H04B 17/309* (2015.01);
(Continued)

(58) Field of Classification Search
CPC ... H04B 17/104; H04B 17/309; H04L 1/0026; H04L 1/00; H04W 72/1205; H04W 24/10
See application file for complete search history.

(56) References Cited

U.S. PATENT DOCUMENTS

2013/0294382 A1* 11/2013 Xu .................. H04L 5/0048
370/329
2014/0133428 A1* 5/2014 Kazmi ............... H04W 28/04
370/329
(Continued)

FOREIGN PATENT DOCUMENTS

RU    2443059 C2   5/2011
RU    2520381 C2   3/2014
(Continued)

OTHER PUBLICATIONS

3GPP TSG RAN WG1 Meeting #86bis R1-1609985 Lisbon, Portugal Oct. 10-14, 2016 Agenda item: 7.2.5.3 Source: Qualcomm Incorporated (Year: 2016).*
(Continued)

*Primary Examiner* — Mehmood B. Khan
(74) *Attorney, Agent, or Firm* — Christopher & Weisberg, P.A.

(57) ABSTRACT

Methods and related nodes are disclosed that can enable the control of the impact of SRS switching on uplink response transmissions. In some aspects, the method comprises determining a need to report measurements to a radio network node within a measurement reporting delay, determining a need to perform an SRS switching procedure, extending the measurement reporting delay associated with reporting the measurements to the radio network node in order to allow the UE to perform the SRS network node within a measurement reporting delay.

24 Claims, 9 Drawing Sheets

(51) Int. Cl.
*H04W 72/12* (2009.01)
*H04B 17/10* (2015.01)
*H04B 17/309* (2015.01)

(52) U.S. Cl.
CPC ............... *H04L 1/00* (2013.01); *H04W 24/10* (2013.01); *H04W 72/1205* (2013.01)

(56) References Cited

U.S. PATENT DOCUMENTS

| | | | |
|---|---|---|---|
| 2015/0117284 A1* | 4/2015 | Baldemair | H04L 1/0026 370/311 |
| 2015/0312784 A1* | 10/2015 | You | H04B 17/318 370/252 |
| 2016/0119934 A1* | 4/2016 | Uchino | H04W 52/0216 455/452.1 |
| 2018/0092118 A1* | 3/2018 | Kim | H04W 28/0278 |
| 2018/0242164 A1* | 8/2018 | Lee | H04L 5/0048 |
| 2018/0310195 A1* | 10/2018 | Zhang | H04L 5/0057 |
| 2018/0376343 A1* | 12/2018 | Harada | H04L 5/0048 |
| 2019/0124539 A1* | 4/2019 | Kim | H04L 5/0057 |
| 2021/0112399 A1* | 4/2021 | Gopal | H04L 25/0226 |

FOREIGN PATENT DOCUMENTS

| | | |
|---|---|---|
| RU | 2521292 C2 | 3/2014 |
| RU | 2014 101 630 A | 7/2015 |
| WO | 2008/131262 A1 | 10/2008 |
| WO | 2011/093756 A1 | 8/2011 |
| WO | 2011/103966 A1 | 9/2011 |
| WO | 2012/154106 A1 | 11/2012 |
| WO | 2017/173388 A1 | 10/2017 |

OTHER PUBLICATIONS

Qualcomm Incorporated: "Collision handling"; R1-1609985, 3GPP TSG RAN WG1 Meeting #86bis, Lisbon, Portugal Oct. 10-14, 2016, 7 pages.
Huawei et al: "Discussion on SRS carrier based switching", R4-162440, 3GPP TSG-RAN WG4 Meeting #78bis, San Jose del Cabo, MX, Apr. 11-15, 2016, 3 pages.
ISR and Written Opinion from corresponding application PCT/IB2017/056835.
Indian Office Action dated Oct. 22, 2020 issued in corresponding Indian Application No. 201937016763, consisting of 6 pages.
European Examination Report dated Mar. 2, 2021 issued in corresponding European Patent Application No. 17 804 664.5, consisting of 5 pages.

* cited by examiner

CONTROLLING THE IMPACT OF SRS SWITCHING ON UPLINK TRANSMISSIONS

RELATED APPLICATIONS

The present application claims the benefits of priority of U.S. Provisional Patent Application No. 62/416,411, entitled "CONTROLLING THE IMPACT OF SRS SWITCHING ON UPLINK RESPONSE TRANSMISSIONS", and filed at the United States Patent and Trademark Office on Nov. 2, 2016, the content of which is incorporated herein by reference.

TECHNICAL FIELD

The present description generally relates to wireless communications and wireless communication networks, and more particularly relates to reference signals and reference signaling in wireless communication networks.

BACKGROUND

Sounding Reference Signals

Sounding reference signals (SRS) are known signals that are transmitted by user equipments (UEs), e.g., to allow the base station or eNodeB to estimate different uplink channel properties. These estimates may be used for uplink scheduling and link adaptation but also for downlink multiple antenna transmission, especially in case of TDD where the uplink and downlink use the same frequencies. The SRS are shown in FIG. 1 and generally have a time duration of a single OFDM symbol.

SRS can be transmitted in the last symbol of a 1 ms uplink subframe, and for the case with TDD, the SRS can also be transmitted in the special slot UpPTS. The length of UpPTS can be configured to be one or two symbols. In FIG. 2, an example is given for TDD with 3 downlink (DL) subframes and 2 uplink (UL) subframe. Generally, within a 10 ms radio frame, up to eight symbols may be set aside for sounding reference signals (SRS).

The configuration of SRS symbols, such as SRS bandwidth, SRS frequency domain position, SRS hopping pattern, and SRS subframe configuration are usually set semi-statically as a part of RRC information element.

There are two types of SRS transmissions in LTE UL: 1) periodic SRS transmissions, and 2) aperiodic SRS transmissions. Periodic SRS is transmitted at regular time instances as configured by means of RRC signaling. Aperiodic SRS is a one-shot transmission that is triggered by signaling in PDCCH.

There are two different configurations related to SRS: 1) Cell specific SRS configuration, and 2) UE specific configuration. The cell specific configuration indicates what subframes may be used for SRS transmissions within the cell as illustrated, for instance, in FIG. 2. The UE specific configuration indicates to the UE a pattern of subframes (among the subframes reserved for SRS transmission within the cell) and frequency domain resources to be used for SRS transmission of that specific UE. It also includes other parameters that the UE can use when transmitting the signal, such as frequency domain comb and cyclic shift.

This means that sounding reference signals from different UEs can be multiplexed in the time domain, by using UE-specific configurations such that the SRS of two UEs are transmitted in different subframes. Furthermore, within the same symbol, sounding reference signals can be multiplexed in the frequency domain. The set of subcarriers is divided into two sets of subcarriers, or combs with the even and odd subcarriers respectively in each such set. Additionally, UEs may have different bandwidths to get additional FDM (The comb enables frequency domain multiplexing, or FDM, of signals with different bandwidths and also overlapping.). Additionally, code division multiplexing can be used. In such cases, different UEs can use exactly the same time and frequency domain resources by using different shifts of a basic base sequence.

SRS Carrier Based Switching

In LTE networks, there are many kinds of downlink heavy traffic, which leads to a larger number of aggregated downlink component carriers (CCs) than the number of (aggregated) uplink CCs. For the existing UE categories, the typical carrier aggregation (CA) capable UEs only support one or two uplink CCs while up to 5 CCs can be aggregated in downlink.

Some of the TDD carriers with downlink transmissions for the UE may have no uplink transmission(s) including SRS, and channel reciprocity cannot be used for these carriers. Such situations will become more severe with CA enhancement of up to 32 CCs where a large portion of the CCs are TDD. Allowing fast carrier switching to and between TDD uplink carriers can be a solution to allow SRS transmission on these TDD carriers.

SRS based carrier switching is aiming to support SRS switching to and between TDD component carrier(s), where the component carriers available for SRS transmission correspond to the component carriers available for carrier aggregation of PDSCH, while the UE has fewer component carriers available for carrier aggregation of PUSCH.

SRS based carrier switching simply means that during certain time resources the UE does not transmit any signal on one carrier (e.g. F1) while it transmits SRS on another carrier (e.g. F2). For example, F1 and F2 can be PCell and SCell respectively, or both can be SCells.

CA-Related Interruptions in LTE

The current CA-related interruption requirements are specified in 36.133, v13.3.0, e.g., as below.

=====<<<<<<TS 36.133>>>>>=====

7.8.2.3 Interruptions at SCell activation/deactivation for intra-band CA

When an intra-band SCell is activated or deactivated as defined in [2] the UE is allowed an interruption of up to 5 subframes on PCell during the activation/deactivation delay defined in Section 7.7. This interruption is for both uplink and downlink of PCell.

7.8.2.4 Interruptions at SCell activation/deactivation for inter-band CA

When an inter-band SCell is activated or deactivated as defined in [2] the UE that requires interruption is allowed an interruption of up to 1 subframe on PCell during the activation/deactivation delay defined in Section 7.7. This interruption is for both uplink and downlink of PCell.

=====<<<<<<TS 36.133>>>>>=====

Similar interruptions may occur also due to SRS switching.

UL Response Transmissions

ACK/KNACK Feedback

ACK/NACK feedback is used, e.g., in LTE, by the intended receiving node to inform a transmitting node that its transmission has been or has not been successfully received. The ACK/NACKs may be transmitted in response to downlink or uplink transmissions by UE (via uplink control channel or data channel) or base station or eNB (via the PHICH), respectively. For HARQ feedback (i.e. ACK or NACK) transmitted by the UE in uplink, it is in general expected that in FDD the UE transmits the feedback in subframe n+4 for the downlink reception in subframe n. For TDD, the relation is also pre-defined but depends on the TDD configuration. In HD-FDD, the timing relation between reception of data at the UE and transmission of HARQ feedback (i.e. ACK or NACK) in the uplink is also pre-defined e.g. in NB-IoT, the ACK/NACK is sent in subframe n+12.

CSI Feedback

Channel state information (CSI) feedback is used to deliver the information for eNBs about downlink channel state. CSI may be of different types: CQI, PMI, RI, and PTI, which may also be viewed as a special type of radio measurements.

Radio Measurement Reporting

UE receives radio signals/channels in downlink, performs one or more radio measurements, and reports one or more results of the radio measurements. Some radio measurement examples are RSRP/RSRQ, CSI (including CQI, PMI, RI, PTI), timing measurements, or even CGI reading or SI (system information) reading. In addition to measurement time (a.k.a. measurement period) requirements, there may also be measurement reporting delay requirements.

Bidirectional Measurements

The radio measurements can be unidirectional or bidirectional. Examples of bidirectional measurements are Rx-Tx (e.g., UE Rx-Tx, eNB Rx-Tx), timing advance type 1 and timing advance type 2 (see 3GPP 36.214), round trip time (RTT), etc. For example, with UE Rx-Tx, the UE upon receiving radio signals (CRS) in downlink transmits an uplink transmission (SRS or RACH), which may also be viewed as a type of UL response transmissions.

UL Transmission Based on Scheduling or Trigger Received in DL

The UE may be required to transmit (e.g., a physical signal or a physical channel or data via higher layers) or provide some information within a certain time or with at most some maximum delay upon receiving in downlink a transmission request or a trigger or scheduling information. Herein, such transmissions may also be viewed as UL response transmissions.

Pre-Defined Acknowledgement of a UE Operation

For example, upon activating a CC, the UE should report corresponding valid CSI for the activated SCell on the next available uplink reporting resource after receiving the reference signal. In another example, with dual connectivity, upon receiving PSCell addition in subframe n, the UE should be capable to transmit a PRACH preamble towards the PSCell no later than in subframe n+$T_{config\_PSCell}$ (as specified in 3GPP TS 36.133).

SUMMARY

SRS carrier based switching and related transmissions (e.g., SRS and PRACH) may impact UL transmissions (e.g., UL response transmissions), which may not be possible to transmit in time. Therefore, new mechanisms are needed to control the impact of SRS switching on UL transmissions.

According to a broad aspect, the UE adapts its SRS carrier based switching configuration and/or associated transmissions (e.g., SRS or PRACH) and/or its UL transmissions in order to control (e.g., avoid, reduce, or minimize) the impact of SRS carrier based switching (e.g., interruption impact or the impact of sharing the transmitter or other UE resources) on UL transmissions. The adaptation is used to maintain UE performance and/or ensure that the UE is able to meet corresponding requirements.

According to one aspect, some embodiments include a method implemented in a UE, the method comprises determining a need to report measurements to a radio network node within a measurement reporting delay, determining a need to perform a sounding reference signal, SRS, switching procedure, extending the measurement reporting delay associated with reporting the measurements to the radio network node in order to allow the UE to perform the SRS switching procedure, and reporting the measurements to the radio network node within the extended measurement reporting delay.

In some embodiments, the method may comprise, or further comprise, performing the measurements prior to determining the need to report measurements to the radio network node within the measurement reporting delay.

In some embodiments, determining a need to report measurements to a radio network node within a measurement reporting delay may be based, at least in part, on a measurement configuration or on a measurement reporting configuration. In such embodiments, the measurement configuration or the measurement reporting configuration may be received from the radio network node.

In some embodiments, the measurements may comprise power measurements. In such embodiments, the power measurements may comprise received signal strength measurements. In such embodiments, the power measurements may comprise, or further comprise, Reference Signal Received Power (RSRP) measurements.

In some embodiments, the measurements may comprise quality measurements. In such embodiments, the quality measurements may comprise received signal quality measurements. In such embodiments, the quality measurements may comprise, or further comprise, Reference Signal Received Quality (RSRQ) measurements.

In some embodiments, the measurements may comprise timing measurements. In such embodiments, the timing measurements may comprise different time measurements. In such embodiments, the timing measurements may comprise, or further comprise, Rx-Tx measurements, or Round-Trip-Time (RTT) measurements, or Reference Signal Time Difference (RSTD) measurements, or Time of Arrival (TOA) measurements, or Time Difference of Arrival (TDOA) measurements.

In some embodiments, the measurements may be event-triggered measurements.

In some embodiments, determining a need to perform a SRS switching procedure may comprise receiving a SRS request message from the radio network node or from another radio network node.

According to another aspect, some embodiments include a UE configured, or operable, to perform one or more UE functionalities (e.g. steps, actions, etc.) as described herein.

In some embodiments, the UE may comprise a communication interface configured to communicate with one or more radio nodes and/or with one or more network nodes, and processing circuitry operatively connected to the communication interface, the processing circuitry being configured to perform one or more UE functionalities as described herein. In some embodiments, the processing circuitry may comprise at least one processor and at least one memory storing instructions which, upon being executed by the processor, configure the processor to perform one or more UE functionalities as described herein.

In some embodiments, the UE may comprise one or more functional modules configured to perform one or more UE functionalities as described herein.

According to another aspect, some embodiments include a computer program product comprising a non-transitory computer readable storage medium storing computer readable program instructions or code which, upon being executed by processing circuitry (e.g., a processor) of the UE, configure the processing circuitry to perform one or more UE functionalities as described herein.

Some embodiments may enable the quality of UE UL transmissions to be maintained even when the UE is performing SRS switching.

This summary is not an extensive overview of all contemplated embodiments, and is not intended to identify key or critical aspects or features of any or all embodiments or to delineate the scope of any or all embodiments. In that sense, other aspects and features will become apparent to those ordinarily skilled in the art upon review of the following description of specific embodiments in conjunction with the accompanying figures.

BRIEF DESCRIPTION OF THE DRAWINGS

Exemplary embodiments will be described in more detail with reference to the following figures, in which.

DETAILED DESCRIPTION

The embodiments set forth below represent information to enable those skilled in the art to practice the embodiments. Upon reading the following description in light of the accompanying figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the singular forms "a", "an" and "the" are intended to include the plural forms as well, unless the context clearly indicates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

Figure 1:
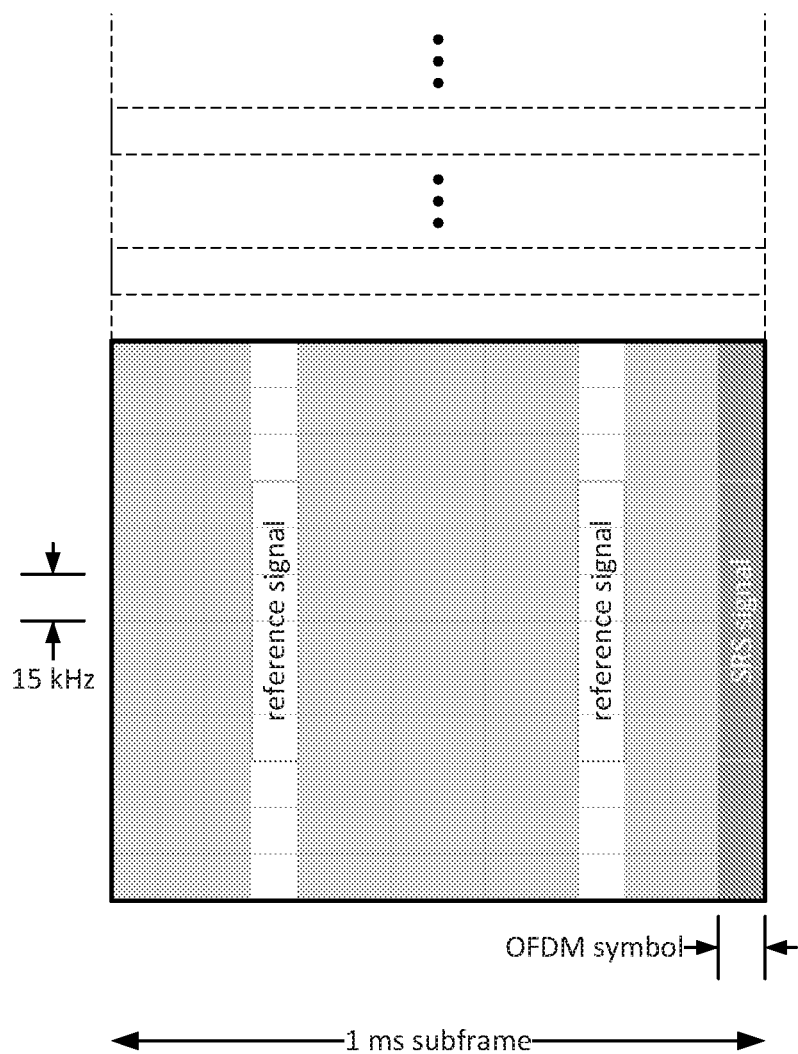
FIG. 1 is a diagram of an uplink subframe in which SRS can be transmitted in accordance with some embodiments.
Figure 2:
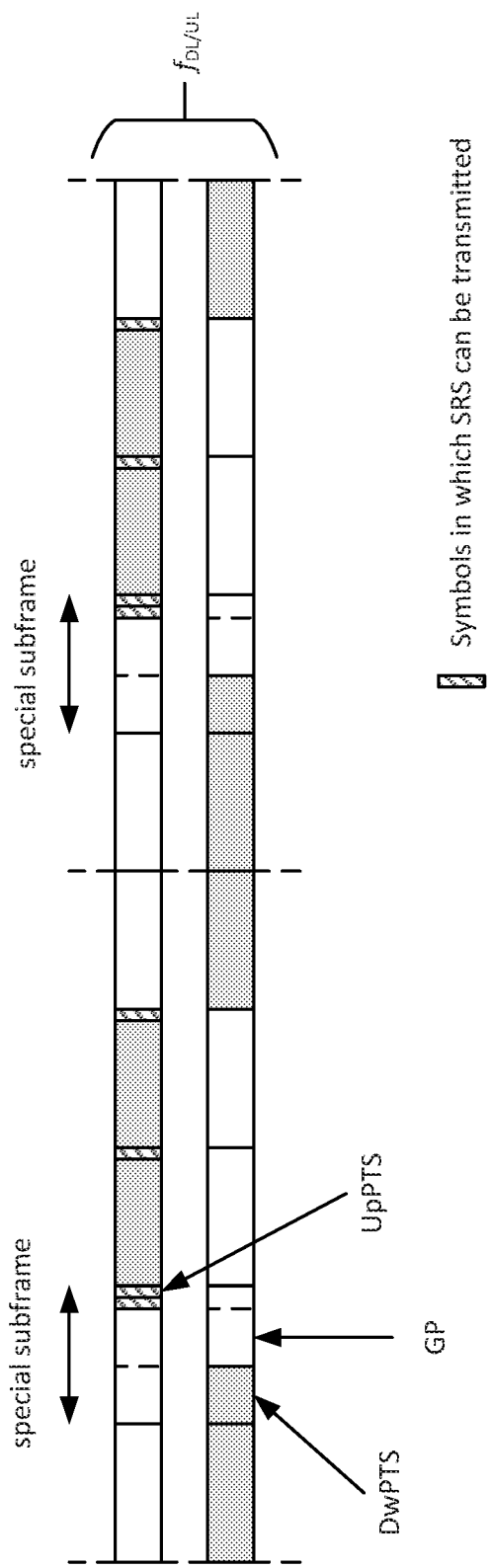
FIG. 2 is a diagram of an example of downlink and uplink subframes configuration in TDD.
Figure 3:
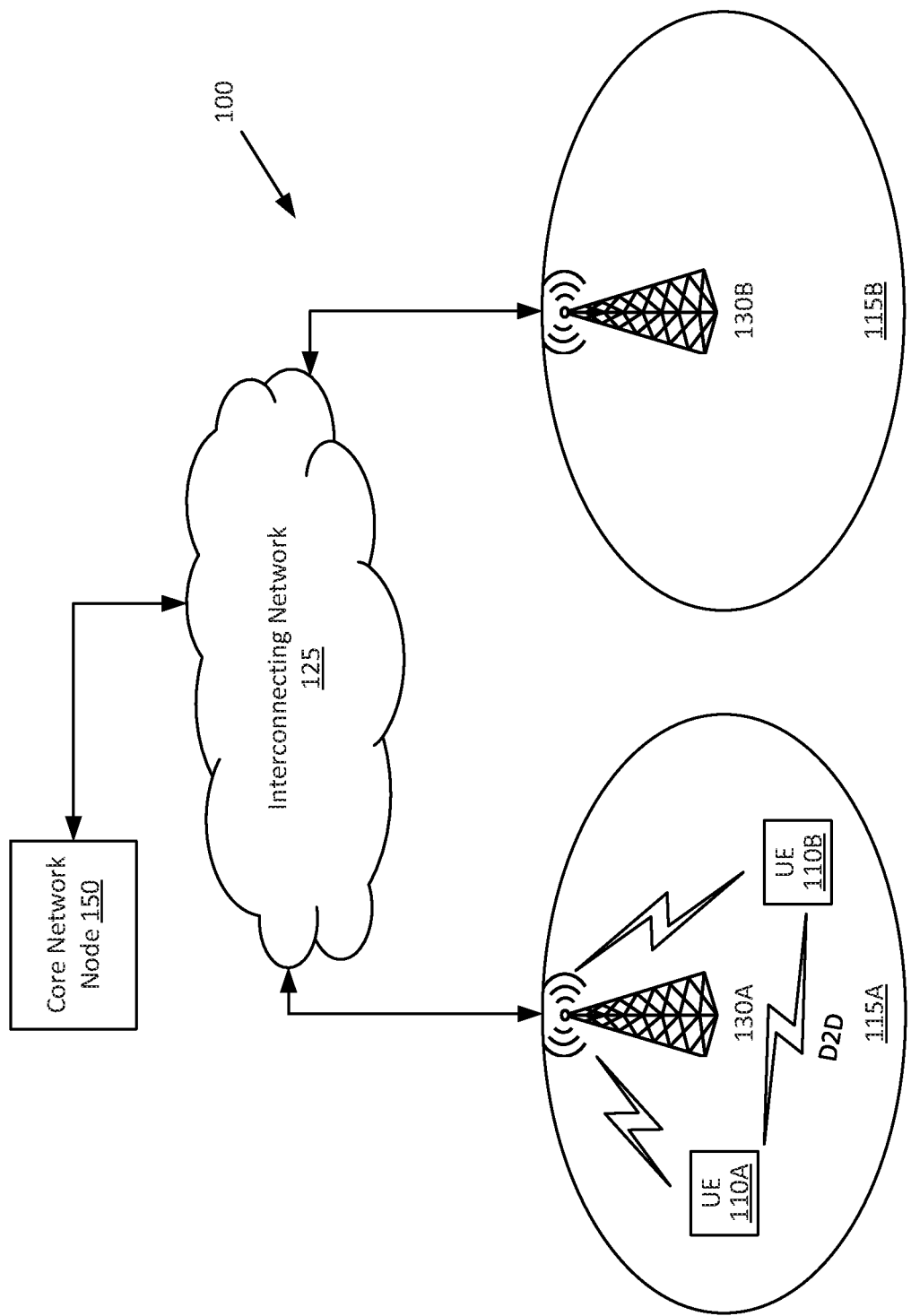
FIG. 3 is a schematic diagram of an example wireless communication network in accordance with some embodiments.

FIG. 3 illustrates an example of a wireless network 100 that may be used for wireless communications. Wireless network 100 includes UEs 110A-110B and a plurality of radio network nodes 130A-130B (e.g., eNBs, gNBs, etc.) connected to one or more core network nodes 150 via an interconnecting network 125. The network 100 may use any suitable deployment scenarios. UEs 110 within coverage areas 115A and 115B may each be capable of communicating directly with radio network nodes 130 over a wireless interface. In certain embodiments, UEs may also be capable of communicating with each other via device-to-device (D2D) communication.

As an example, UE 110A may communicate with radio network node 130A over a wireless interface. That is, UE 110A may transmit wireless signals to and/or receive wireless signals from radio network node 130A. The wireless signals may contain voice traffic, data traffic, control signals, and/or any other suitable information. In some embodiments, an area of wireless signal coverage associated with a radio network node 130 may be referred to as a cell.

In some embodiments, a more general term "network node" is used and can correspond to any type of radio network node (or radio access node) or any network node, which can communicate with a UE and/or with another network node in a cellular, mobile, and/or wireless communication system. Examples of network nodes are NodeB, eNB, MeNB, SeNB, a network node belonging to MCG or SCG, base station (BS), multi-standard radio (MSR) radio network node such as MSR BS, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, SON, positioning node (e.g. E-SMLC), MDT, test equipment, etc. Example embodiments of a network node are described in more detail below with respect to FIG. 9.

In some embodiments, the terms "user equipment" or "UE" may be used herein to refer to any type of wireless device communicating with a network node and/or with another UE in a cellular, mobile, and/or wireless communication system. Examples of UE are target device, device to device (D2D) UE, machine type UE or UE capable of machine to machine (M2M) communication, personal digital assistant (PDA), tablet, mobile terminal, smart phone, laptop embedded equipped (LEE), laptop mounted equipment (LME), USB dongles etc. Example embodiments of a UE are described in more detail below with respect to FIG. 8.

In the description, any of the above-mentioned nodes, including UE, network node, and radio network node, can be "the first node" and/or "the second node" in the embodiments described herein. In some embodiments, the first node and the second node may be capable of at least one of transmitting and receiving in licensed and/or unlicensed spectrum.

In some embodiments, the terms "radio access technology" or "RAT" may refer to any RAT, e.g., UTRA, E-UTRA, narrow band internet of things (NB-IoT), Wi-Fi, Bluetooth, next generation RAT (NR), 4G, 5G, etc. Any of the first and the second nodes may be capable of supporting a single or multiple RATs.

A UE may be configured to operate in carrier aggregation (CA) implying aggregation of two or more carriers in at least one of DL and UL directions. With CA, a UE can have multiple serving cells, wherein the term "serving" herein means that the UE is configured with the corresponding serving cell and may receive from and/or transmit data to the network node on the serving cell e.g. on PCell or any of the SCells. The data is transmitted or received via physical channels e.g. PDSCH in DL, PUSCH in UL, etc. A component carrier (CC) also interchangeably called as carrier or aggregated carrier, PCC or SCC, is configured at the UE by the network node using higher layer signaling e.g. by sending RRC configuration message(s) to the UE. The configured CC is used by the network node for serving the UE on the serving cell (e.g. on PCell, PSCell, SCell, etc.) of the configured CC. The configured CC is also used by the UE for performing one or more radio measurements (e.g. RSRP, RSRQ, etc.) on the cells operating on the CC e.g. PCell, SCell, or PSCell, and neighboring cells.

In some embodiments, the terms "dual connectivity" or "DC" used herein may refer to the operation mode wherein the UE can be served by at least two nodes called master eNB (MeNB) and secondary eNB (SeNB). More generally, in multiple connectivity (also referred to as multi-connectivity) operation, the UE can be served by two or more nodes e.g. MeNB, SeNB1, SeNB2, and so on. The UE is configured with PCC from both MeNB and SeNB. The PCell from MeNB and SeNB are called as PCell and PSCell respectively. The PCell and PSCell operate the UE typically independently. The UE can also be configured with one or more SCCs from each of MeNB and SeNB. The corresponding secondary serving cells served by MeNB and SeNB are called SCell. The UE in DC typically has separate transceivers for each of the connections with MeNB and SeNB. This allows the MeNB and SeNB to independently configure the UE with one or more procedures e.g. radio link monitoring (RLM), DRX cycle, etc., on their PCell and PSCell respectively.

In some embodiments, the term "SRS" used herein may refer to any type of reference signal (RS) or more generally physical radio signals transmitted by the UE in the UL to enable the network node to determine the UL signal quality, e.g. UL SNR, UL SINR, etc. Examples of such reference signals are sounding reference signals, DMRS, UE specific reference or pilot signals, etc. The embodiments are applicable to any type of RS i.e. switching of carrier transmitting any type of RS.

In some embodiments, the term "signal" used herein can be any physical signal, including, but not limited to, reference signal such as PSS, SSS, CRS, PRS, etc.

In some embodiments, the term "channel" (e.g., in the context of channel reception) used herein can be any physical channel, including, but not limited to, MIB, PBCH, NPBCH, PDCCH, PDSCH, MPDCCH, NPDCCH, NPDSCH, E-PDCCH, PUSCH, PUCCH, NPUSCH, etc.

In some embodiments, the term "time resource" used herein may correspond to any type of physical resource or radio resource expressed in terms of length of time. Examples of time resources include symbol, time slot, subframe, radio frame, TTI, interleaving time, etc.

In some embodiments, the term "radio measurement" used herein may comprise any measurement based on receiving a radio signal or channel, e.g., power-based measurements such as received signal strength (e.g., RSRP or CSI-RSRP) or quality measurements (e.g., RSRQ, RS-SINR, SINR, Es/Iot, SNR); cell identification; synchronization signals measurements; angle measurements such as angle of arrival (AOA); timing measurements such as Rx-Tx, RTT, RSTD, TOA, TDOA, timing advance; throughput measurements; channel quality measurements such CSI, CQI, PMI. A measurement may be absolute, relative to a common reference or to another measurement, composite measurement, etc. A measurement may be on one link or more than one links (e.g., RSTD, timing advance, RTT, relative RSRP; etc.). Measurements may also be differentiated by purpose and may be performed for one or more purposes, e.g., for one or more of: RRM, MDT, SON, positioning, timing control or timing advance, synchronization.

Herein, the term "radio measurement" may be used in a broader sense, e.g., receiving a channel (e.g., receiving system information via broadcast or multicast channel).

In some embodiments, the term "requirements" used herein may comprise any type of UE requirements related to UE measurements, also referred to as measurement requirements, RRM requirements, mobility requirements, positioning measurement requirements, etc. Examples of UE requirements related to UE measurements include measurement time, measurement reporting time or delay, measurement accuracy (e.g. RSRP/RSRQ accuracy), number of cells to be measured over the measurement time, etc. Examples of measurement time are L1 measurement period, cell identification time or cell search delay, CGI acquisition delay, etc.

In some embodiments, SRS switching and SRS carrier based switching may be used interchangeably to describe transmitting SRS on different carriers. SRS switching may be based on a time and/or frequency domain pattern.

In some embodiments, the term "UL response transmission" may comprise, e.g., UE measurement report, CSI feedback, UE ACK/NACK transmission, UE transmission comprising one of the two measurement components of a bidirectional measurement, UE transmission in response a signal/channel/message received in DL, pre-defined acknowledgement of completing a UE operation (e.g., CC (de)activation or PSCell addition/release), etc.

A broad exemplary scenario comprises of a UE being served by a first network node with a PCell operating on a first carrier frequency (f1), wherein the UE is also capable of being served by at least one secondary serving cell (SCell) also known as a first SCell. The UE may further be capable of being served by two or more SCells, e.g., the first SCell operates on a second carrier frequency (f2) and the second SCell operates on a third carrier frequency (f3). The same applies for more than two SCells. The carrier frequency f1 is interchangeably called as PCC, while carrier frequencies f2, f3, . . . f(n) may interchangeably be called as SCC1, SCC2, SCC(n−1), etc., respectively.

In one example, all f1, f2, and f3 belong to a licensed spectrum. In yet another example, carriers f1 and f3 may belong to a licensed spectrum or frequency band, whereas f2 may belong to an unlicensed spectrum or frequency band. Other combinations are also possible. In an unlicensed spectrum or band, contention based transmission is allowed i.e. two or more devices (UE or network nodes) can access even the same part of spectrum based on certain fairness constraints, e.g. LBT. In this case, no operator (or user or transmitter) owns the spectrum. In a licensed spectrum or licensed band, only contention free transmission is allowed i.e. only devices (UE or network nodes) allowed by the owner of the spectrum license can access the licensed spectrum. In one example of the use case, all carriers can be in unlicensed spectrum, or in a licensed shared spectrum or in a spectrum where LBT is required.

In one example, the CCs and the corresponding serving cells of a UE may be comprised all in the same node. In another example, at least two of them may be comprised in different nodes, which may be co-located or non-collocated.

In one example, all the CCs and the corresponding serving cells of a UE may be configured in the same timing advance group (TAG) e.g. pTAG. In another example, some CCs and the corresponding serving cells of a UE may be configured in one timing advance group (TAG) (e.g. pTAG) and remaining CCs in another TAG (e.g. sTAG). In yet another example, the UE may be configured with 2 or more TAGs.

The above scenarios may also comprise DC or multi-connectivity operations performed based on corresponding CA configurations, where PSCell in different embodiments may be belong, e.g., to a set of SCells.

SRS switching may involve at least one of:
  starting SRS transmission on a first carrier frequency and/or stopping SRS transmission on a second carrier frequency, wherein the first and the second carrier frequency may belong to licensed and/or unlicensed spectrum, same RAT or different RATs. According to the earlier examples, the SRS carrier based switching may involve any one or more carriers of f1, f2, f3, ... f(n);
  starting and/or stopping SRS transmission from one or more antennas or antenna ports.

In one example, SRS switching may comprise carrier based SRS switching and/or antenna based SRS switching.

The SRS switching may be controlled by the network and/or by the UE.

Even though some embodiments are described for carrier based SRS switching, they are applicable for any SRS switching type.

Switching among carriers and/or antennas during SRS switching may cause some interruptions, e.g., to PCell or activated SCell, which may be due to UE reconfiguration such as configuring and/or activating target carriers (to which the SRS transmission is switched to), deconfiguring and/or deactivating source carriers (from which SRS transmission is switched), delays, reduced performance, etc.

Figure 4:
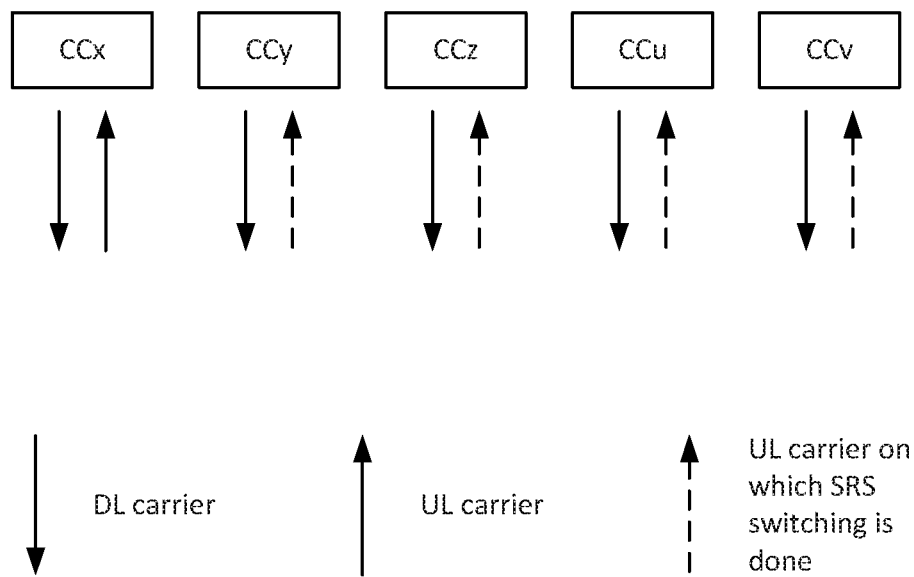
FIG. 4 is a schematic diagram of an example of SRS carrier based switching.

As an exemplary CC combination shown in FIG. 4, there is a CA arrangement with 5 DL component carriers and 2 UL component carriers. In this example, one UL component carrier is fixed in the PCell and the SRS switching is done on one of the SCells (e.g., from SCell 1 to SCell2). So, at any point of time, it is a 2 UL component carriers combination. The same example scenario can also be shown with other numbers aggregated CCs in DL and UL respectively. The carriers, i.e. CCy, CCz, CCu and CCv, can be in different band also. For example, CCy can be in any band below 1 GHz, CCz can be in any band around 2 GHz, and CCu can be any band in 3.5 GHz.

The term "served" or "being served" herein means that the UE is configured with the corresponding serving cell and can receive from and/or transmit data to the network node on the serving cell e.g. on PCell or any of the SCells. The data is transmitted or received via physical channels e.g. PDSCH in DL, PUSCH in UL, etc.

The UE may be requested to switch SRS transmission to one or more serving cells by the network node. In some embodiments one or more SRS switching messages or commands may be received by the UE, e.g., via RRC signaling, via MAC CE command, or via a physical layer message (e.g., downlink control information (DCI) carried by a PDCCH), etc.

For example, the following signaling may apply:
  Receiving a first serving cell SRS switching request message or command from a second network node for switching SRS carrier from the first serving cell;
  Receiving a second serving cell SRS switching request message or command from a third network node for switching SRS carrier from the second serving cell;
  Receiving a third serving cell SRS switching request message or command from a fourth network node for switching SRS carrier from the third serving cell.

In some embodiments, at least some of the first, second, third and fourth network nodes are the same or are co-located at the same site or location. For example, in such embodiments, the UE may receive one or more messages or command for switching SRS carrier(s) from one or more serving cells from the first network node. Also, for example in such embodiments, the UE may receive one or more messages for SRS switching of one or more serving cells from the PCell.

In some embodiments, any combination of the first, second, third and fourth network nodes are different and may be located at different sites or location or may be logically different nodes that may still be co-located. In such embodiments, the UE may receive one or more messages for SRS carrier switching from one or more serving cells from the respective serving cells.

Figure 5:
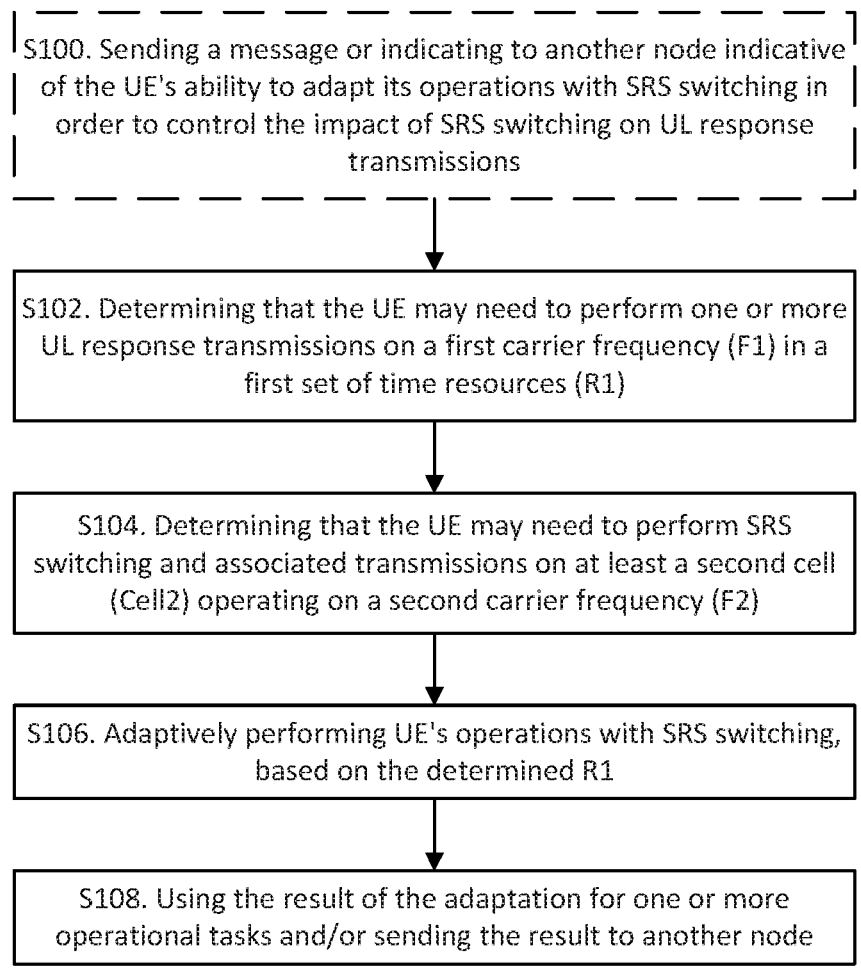
FIG. 5 is a flow chart of operations of a user equipment (UE) in accordance with some embodiments.

FIG. 5 illustrates an embodiment of a method which can be performed in a UE such as UE 110. The method may comprise:

Step S100 (Optional): Sending a message or indicating to another node (e.g., a network node or another UE) indicative of the UE's ability to adapt its operations with SRS switching in order to control (e.g., avoid, reduce, or minimize) the impact of SRS switching on UL response transmissions.

Step S102: Determining that the UE may need to perform one or more UL response transmissions on a first carrier frequency (F1) in a first set of time resources (R1).

Step S104: Determining that the UE may need to perform SRS switching and associated transmissions (e.g., SRS and/or PRACH) on at least a second cell (cell2) operating on a second carrier frequency (F2)

Step S106: Adaptively performing UE's operations with SRS switching, based on the determined R1.

Step S108: Using the result of the adaptation for one or more operational tasks and/or sending the result to another node.

It will be appreciated that one or more of the above steps may be performed simultaneously and/or in a different order. Also, steps illustrated in dashed lines are optional and may be omitted in some embodiments.

The steps will now be described in more detail.

Step S100

In this step, the UE may send a message or indicate to another node (e.g., a network node or another UE) the UE's ability to adapt its operations with SRS switching in order to control (e.g., avoid, reduce, or minimize) the impact of SRS switching on UL response transmissions.

The impact of SRS switching may comprise, e.g., interruptions impact, additional delays e.g. due to switching, dropping/deprioritizing some UL transmissions (UL response transmissions or SRS switching related transmissions) due to limits imposed by UE uplink carrier aggregation capability, etc.

The indication may also comprise the UE's ability to operate according to one or more embodiments described herein.

The capability may be signaled, e.g., upon a request from another node or upon a triggering condition or event or receiving a certain message from another node.

Step S102

In this step, the UE may determine that it may need to perform one or more UL response transmissions on a first carrier frequency (F1) in a first set of time resources (R1).

In some embodiments, the UL response transmissions may be transmitted in response to receiving one or more radio signals on F1 in another set of time resources (R1*). The UE may determine R1 based on the determined R1*.

The need to perform one or more UL response transmissions may be determined, e.g., based on one or more of:
  Pre-defined rule or requirement (e.g., the UE is expected to transmit not later than after time T or in a specific time resource n+k if the DL reception was received in time resource n);
  Measurement configuration;
  Measurement reporting configuration;
  Trigger or message (e.g., unicast/multicast/broadcast) received from another node and the associated time resources R1*;
  Specific signal or channel received from another node and the associated time resources R1*;
  Scheduling grant and associated time resources R1*;
  Timer or counter (e.g., for periodic reporting);
  Completing an operation (e.g., CC activation);
  Specific set of resources R are dedicated or scheduled for critical UL response transmissions (and thus the resources may need to be protected from the impact of SRS switching, even if it is not known in advance whether the transmission will happen, e.g., the UE may not get access to the channel requiring CSMA-like or listening-based or LBT-based channel access prior actually transmitting a configured UL transmission);
  UL resources used for a bidirectional measurement, e.g., UE Rx-Tx;
  UE activity state (e.g., the UE may not transmit at least certain transmissions in UL during a configured DRX inactive state).

Step S104

In this step, the UE may determine the need to perform SRS switching and associated transmissions (e.g., SRS and/or PRACH) on at least a second cell (cell2) operating on a second carrier frequency (F2).

The determining may be based, e.g., on:
  UE activity state (e.g., SRS switching only in non-DRX state or short DRX state, but not in eDRX or not in DRX);
  SRS switching type;
  SRS switching configuration;
  A message, a trigger or an indication indicative of the need to perform the SRS carrier based switching, received from a higher layer in the first node or from another node (e.g., a network node or another UE);
  An event, a condition, or a trigger according to which the SRS carrier based switching needs to be performed;
  A timer in the first node indicating that the SRS carrier based switching needs to be performed (e.g., for periodic or scheduled measurements);
  A time- and/or frequency-domain pattern controlling when the SRS carrier based switching is to be performed and which frequency resources (e.g., carriers) are involved;
  SRS (re)configuration for the SRS transmissions to start in relation to the SRS carrier based switching;
  SRS (re)configuration for the SRS transmissions to stop in relation to the SRS carrier based switching.

Step S106

In this step, the UE may adaptively perform UE's operations with SRS switching, based on the determined R1.

The adaptation may comprise, e.g., adapting one or more of:
  SRS switching configuration;
  transmission(s) associated with SRS switching (e.g., SRS transmissions and/or PRACH transmissions);
  UL response transmission(s).

The adaptation may further comprise, e.g., any one or more of:
  Adapting based on relative priority(-ies) for the procedures or performance of SRS switching and/or its associated transmissions and UL response transmissions;
  Adapting a configuration parameter for SRS switching;
  Adapting a configuration parameter for transmission related to SRS switching (e.g., SRS transmission configuration parameters; PRACH transmission configuration parameters: configuration index, time resources, preamble format, subcarrier spacing, transmit power, etc.);
  Adapting a configuration parameter for UL response transmission(s) (e.g., scheduling or time and/or frequency resources, transmit power, bandwidth, format, number of retransmissions, UL response transmission delay or time period e.g. delay for measurement reporting in UL);
  Dropping/skipping/postponing/delaying/performing earlier/resuming SRS switching and/or SRS transmission;
  Dropping/skipping/postponing/delaying/performing earlier/resuming/retransmitting/rescheduling UL response transmission(s);
  Postponing/delaying/resuming/retransmitting/rescheduling UL response transmission(s) with certain delay e.g. after L1 number time resources;
  Aborting the UL response transmission if it cannot be delivered after L2 number of interruptions due to SRS switching;
  Transmitting UL response transmission on a carrier different from F1 instead of transmitting on F1;
  Misaligning in time (e.g., by adapting periodicity, scheduling in time, any of the above, etc.) of the resources R2 on F1 affected by SRS switching and related PRACH/SRS transmissions and the resources R1 for the UL response transmission, e.g., allowing at least time T or N time resources between R2 and R1 (in a special case, T and N can be zero, i.e. adjacent R2 and R1);

Ensuring that no more than X of R1 resources overlap with R2;

Ensuring that no more than X % of R1 resources overlap with R2;

Ensuring that no more than Y % of R2 resources overlap with R1; Ensuring that the total amount of interruption impact on cell1 (including the interruptions due to SRS switching) is below a threshold or the interruption probability does not exceed a threshold;

Increasing the number of UL response transmission attempts if at least some overlap of R1 and R2 occurs;

Increasing reliability or robustness (e.g., adapting MCS and/or Tx power) of other UL response transmission attempts to compensate for the reduced number of transmission attempts due to the SRs switching impact;

Increasing the measurement period of a bidirectional measurement if one or more of its UL components (comprising UL response transmission) may be impacted by the SRS switching or related SRS transmission;

Reducing the transmit power of one or both of SRS transmission and UL response transmission to ensure that the sum transmit power does not exceed a threshold or the UE transmission capability.

The adapted configuration(s) of SRS switching, SRS transmission(s) and/or UL response transmission(s) may be obtained based, e.g., on a pre-defined rule, requirement, table, message or indication received from another node, etc.

The adaption is performed in order to control (e.g., avoid, reduce, or minimize) the impact of SRS carrier based switching (e.g., interruption impact or the impact of sharing the transmitter or other UE resources) on UL response transmissions. The adaptation is used to maintain UE performance and/or ensure that the UE is able to meet corresponding requirements.

SRS switching configuration may comprise, e.g., one or more of:

SRS switching period (i.e., time after which the UE switch to another carrier to transmit SRS);

Number or a set of carriers involved in SRS carrier based switching;

Sequence in which the carriers are switched;

SRS switching loop length (e.g., the time to the next transmission on the same carrier);

SRS transmission configuration (see e.g. SRS transmission parameters as described in the background);

PRACH transmission configuration;

Time-to-stay on the carrier during SRS carrier based switching;

Minimum or maximum time before SRS transmission on the SRS switching target carrier frequency;

Minimum or maximum time after the SRS transmission on the SRS switching source carrier frequency.

Step S108

In this step, the UE may use the result of the adaptation for one or more operational tasks and/or send the result to another node (e.g., another UE, network node, radio network node, core network node, positioning node, etc.). The result of the adaptation may be any result (e.g., measurement result, interruption count, positioning calculation, link adaptation, power control, etc.) obtained after applying the adaptation.

Examples of the operational tasks:

Informing another node (e.g. network node) that the adaptation has been/is/will be performed by the UE;

Informing another node (e.g. network node) that the adaptation has been/is/will be performed to avoid the impact on measurements on specific carrier frequencies e.g. F 1;

Positioning, RRM, MDT, mobility, SON, resource optimization.

Figure 6:
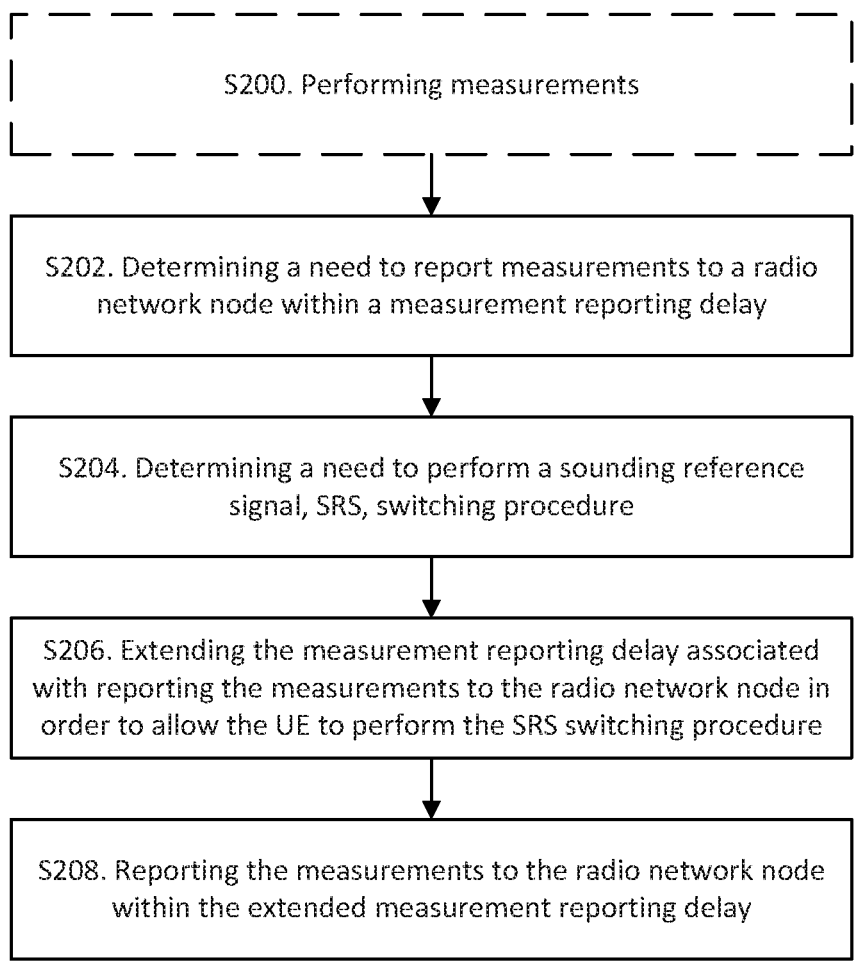
FIG. 6 is another flow chart of operations of a user equipment (UE) in accordance with some embodiments.

FIG. 6 illustrates another embodiment of a method which can be performed in a UE such as UE 110. The method illustrated in FIG. 6 includes some rearrangements of steps and elements previously described (e.g., with respect to FIG. 5). The method may comprise:

Step S200 (Optional): Performing measurements.

Step S202: Determining a need to report measurements to a radio network node within a measurement reporting delay.

Step S204: Determining a need to perform a sounding reference signal, SRS, switching procedure.

Step S206: Extending the measurement reporting delay associated with reporting the measurements to the radio network node in order to allow the UE to perform the SRS switching procedure.

Step S208: Reporting the measurements to the radio network node within the extended measurement reporting delay.

It will be appreciated that one or more of the above steps may be performed simultaneously and/or in a different order. Also, steps illustrated in dashed lines are optional and may be omitted in some embodiments.

The steps will now be described in more detail.

Step S200

In this step, which may be optional, the UE performs one or more measurements. Generally, the measurements are made on signals received from one or more radio network nodes such as radio network node 130.

Step S202

In this step, the UE determines that it needs to report measurements (e.g., the measurements obtained in step S200) to a radio network node (e.g., radio network node 130) within a measurement reporting delay. In some embodiments, the UE may determine this need to report measurements to the radio network node based, at least in part, on a measurement configuration and/or on a measurement reporting configuration which may be received from the radio network node. The measurement configuration and/or the measurement reporting configuration may comprise the type or types of measurements to be performed by the UE and possibly the reporting delays respectively associated with the measurements.

In some embodiments, the measurement reporting delay may be understood as the time between an event that will trigger a measurement report and the point when the UE starts to transmit the measurement report over the air interface.

Step S204

In this step, the UE determines the need to perform a SRS switching procedure. In some embodiments, the UE may determine the need to perform the SRS switching procedure by receiving a request from a radio network node (e.g., radio network node 130). The request may be an SRS request carried by a downlink control information message. In some embodiments, the UE may determine the need to perform the SRS switching procedure upon the occurrence of one or more predetermined events (e.g., the expiration of a timer).

Step S206

In this step, the UE extends the measurement reporting delay associated with reporting the measurements to the radio network node in order to allow the UE to perform the SRS switching procedure. In some embodiments, the UE may extend the measurement reporting delay upon determining the need to perform the SRS switching procedure after having determined the need to report measurements to a radio network node within a measurement reporting delay. In other words, in some embodiments, the UE initially determines the need to report measurements to the radio network node within a measurement reporting delay, then determines the need to perform the SRS switching procedure, and only then proceeds to extend the measurement reporting delay associated with reporting the measurements to the radio network node. In some embodiments, the UE may extend the delay for a predetermined amount of time, e.g., x subframe or y seconds beyond the normal delay. In some embodiments, the UE may extend the delay as long as necessary for the performance and completion of the SRS switching procedure.

Step S208

In this step, the UE reports the measurements to the radio network node within the extended measurement reporting delay.

The measurements transmitted by the UE to the radio network node may comprise different types of measurements. For instance, the measurements may comprise power measurements, quality measurements, and/or timing measurements. Power measurements may include signal strength measurements (e.g., RSRP measurements), quality measurements may include signal quality measurements (e.g., RSRQ measurements), and timing measurements may include different time measurements (e.g., Rx-Tx measurements, RTT measurements, RSTD measurements, TOA measurements, and TDOA measurements). Other measurements are also possible.

Figure 7:
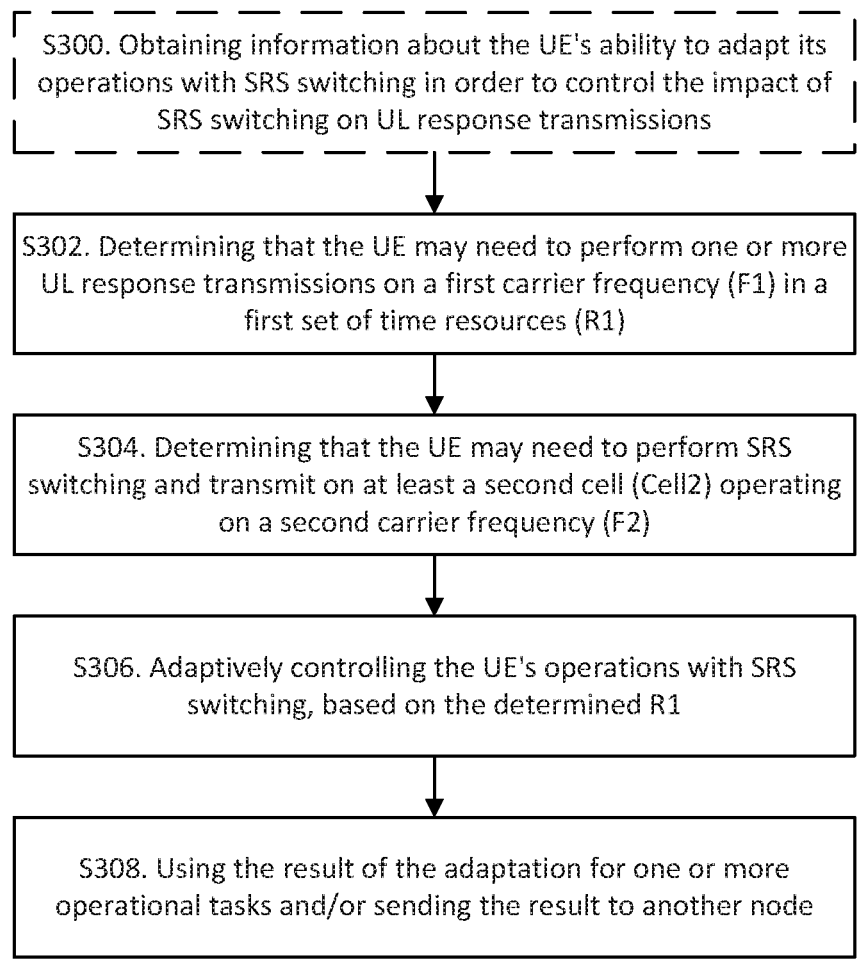
FIG. 7 is a flow chart of operations of a radio network node in accordance with some embodiments.

FIG. 7 illustrates an embodiment of a method which can be performed in a network node such as radio network node 130. The method may comprise:

Step S300 (Optional): Obtaining information about the UE's ability to adapt its operations with SRS switching in order to control (e.g., avoid, reduce, or minimize) the impact of SRS switching on UL response transmissions.

Step S302: Determining that the UE may need to perform one or more UL response transmissions on a first carrier frequency (F1) in a first set of time resources (R1).

Step S204: Determining that the UE may need to perform SRS switching and transmit, e.g. SRS or PRACH, on at least a second cell (Cell2) operating on a second carrier frequency (F2).

Step S306: Adaptively controlling the UE's operations with SRS switching, based on the determined R1.

Step S308: Using the result of the adaptation for one or more operational tasks and/or sending the result to another node.

It will be appreciated that one or more of the above steps may be performed simultaneously and/or in a different order. Also, steps illustrated in dashed lines are optional and may be omitted in some embodiments.

The steps will now be described in more detail.

Step S300

The network node may obtain the UE's capability based on, e.g., receiving a message from the UE or another node, monitoring UE behavior, etc.

Step S302

In this step, the network node determines that the UE may need to perform one or more UL response transmissions on a first carrier frequency (F1) in a first set of time resources (R1).

In some embodiments, the UL response transmissions are to be transmitted by the UE in response to receiving by the UE one or more radio signals on the first carrier frequency (F1) in another set of time resources (R1*). In some embodiments, the determining of R1 may be based on the determined R1*.

One or more of the methods for determining described for the UE above may also apply for the network node.

Step S304

In this step the network node determines that the UE may need to perform SRS switching and transmit, e.g. SRS or PRACH, on at least a second cell (cell2) operating on a second carrier frequency (F2).

The determining may be based, e.g., on SRS switching configuration, on obtained UE's capability previously obtained (see step S300) or capability to support SRS switching, on a request sent to the UE to perform SRS switching, etc.

One or more of the methods for determining described for the UE above may also apply for the network node.

Step S306

In this step, the network node may adaptively control the UE's operations with SRS switching, based on the determined R1. The controlling may further comprise sending a message, indication, a parameter, or a request to the UE.

Examples of adaptation include:

Adapting the measurement configuration and transmitting the adapted measurement configuration to the UE;

Adapting scheduling of signals in the uplink and/or in the downlink;

Changing the sets of or swapping carrier frequencies of PCell, PSCell and/or SCells of the UE;

Adapting SRS configuration e.g. periodicity and/or bandwidth of the SRS.

Other examples of adapting have also been described above in relation to the UE.

Step S308

In this step, the network node may use the result of the adaptation for one or more operational tasks and/or sending the result to another node (e.g., another network node or UE).

The operational tasks may be similar to those described with respect to the UE.

Exemplary Standardization Scenario

In some embodiments, the following sections of 3GPP TS 36.133 v14.1.0 may be modified as follows to enable one or more of the described embodiments.

=====<<<<<<TS 36.133>>>>>>=====

8.1.2.2.1.1.1.3 Event Triggered Reporting

Reported RSRP, RSRQ, and RS-SINR measurements contained in event triggered measurement reports shall meet the requirements in sections 9.1.2.1, 9.1.2.2, 9.1.5.1, and 9.1.17.2.1, respectively.

The UE shall not send any event triggered measurement reports, as long as no reporting criteria are fulfilled.

The measurement reporting delay is defined as the time between an event that will trigger a measurement report and the point when the UE starts to transmit the measurement report over the air interface. This requirement assumes that the measurement report is not delayed by other RRC signalling on the DCCH. This measurement reporting delay excludes a delay uncertainty resulted when inserting the measurement report to the TTI of the uplink DCCH. The delay uncertainty is: $2 \times TTI_{DCCH}$. This measurement reporting delay excludes a delay which caused by no UL resources for UE to send the measurement report.

The event triggered measurement reporting delay, measured without L3 filtering shall be less than $T_{identify\_intra}$ defined in Clause 8.1.2.2.1.1. When L3 filtering is used or IDC autonomous denial is configured or the UE is performing reception and/or transmission for ProSe Direct Discovery and/or ProSe Direct Communication, or the UE is configured to perform SRS carrier based switching, an additional delay can be expected.

If a cell which has been detectable at least for the time period $T_{identify\_intra}$ defined in clause 8.1.2.2.1.1 becomes undetectable for a period≤5 seconds and then the cell becomes detectable again and triggers an event, the event triggered measurement reporting delay shall be less than $T_{Measurement\_Period,\ Intra}$ provided the timing to that cell has not changed more than ±50 Ts and the L3 filter has not been used. When L3 filtering is used or IDC autonomous denial is configured or the UE is performing reception and/or transmission for ProSe Direct Discovery and/or ProSe Direct Communication, configured to perform SRS carrier based switching, an additional delay can be expected.

======<<<<<<TS 36.133>>>>>======

Figure 8:
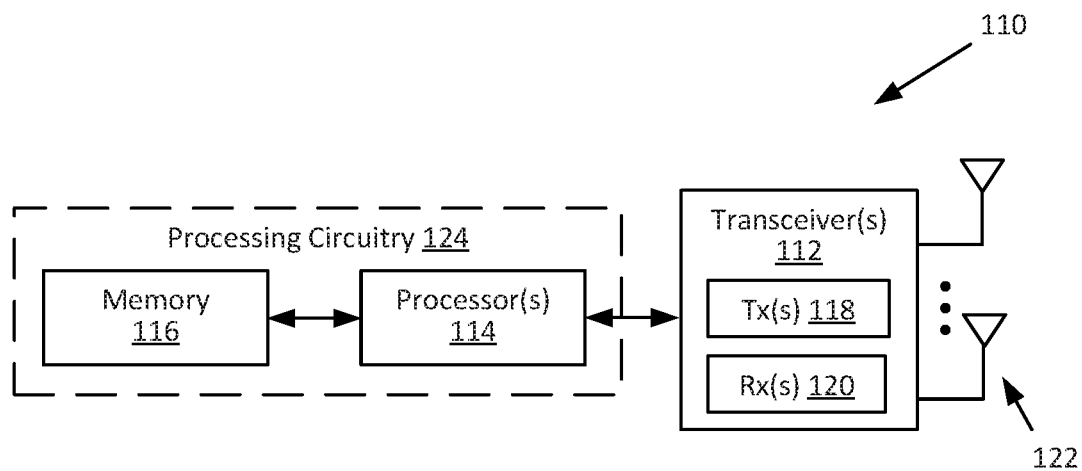
FIG. 8 is a block diagram of a user equipment (UE) in accordance with some embodiments.

FIG. 8 is a block diagram of an exemplary UE 110, in accordance with certain embodiments. UE 110 includes one or more of a transceiver 112, processor 114, and memory 116. In some embodiments, the transceiver 112 facilitates transmitting wireless signals to and receiving wireless signals from radio network node 130 (e.g., via transmitter(s) (Tx) 118, receiver(s) (Rx) 120 and antenna(s) 122). The processor 114 executes instructions to provide some or all of the functionalities described above as being provided by UE 110, and the memory 116 stores the instructions executed by the processor 114. In some embodiments, the processor 114 and the memory 116 form processing circuitry 124.

The processor 114 may include any suitable combination of hardware to execute instructions and manipulate data to perform some or all of the described functions of UE 110, such as the functions of UE 110 described above. In some embodiments, the processor 114 may include, for example, one or more computers, one or more central processing units (CPUs), one or more microprocessors, one or more application specific integrated circuits (ASICs), one or more field programmable gate arrays (FPGAs) and/or other logic.

The memory 116 is generally operable to store instructions, such as a computer program, software, an application including one or more of logic, rules, algorithms, code, tables, etc. and/or other instructions capable of being executed by processor 114. Examples of memory 116 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by the processor 114 of UE 110.

Other embodiments of UE 110 may include additional components beyond those shown in FIG. 8 that may be responsible for providing certain aspects of the UE's functionalities, including any of the functionalities described above and/or any additional functionalities (including any functionality necessary to support the embodiment(s) described above). As just one example, UE 110 may include input devices and circuits, output devices, and one or more synchronization units or circuits, which may be part of the processor. Input devices include mechanisms for entry of data into UE 110. For example, input devices may include input mechanisms, such as a microphone, input elements, a display, etc. Output devices may include mechanisms for outputting data in audio, video and/or hard copy format. For example, output devices may include a speaker, a display, etc.

Figure 9:
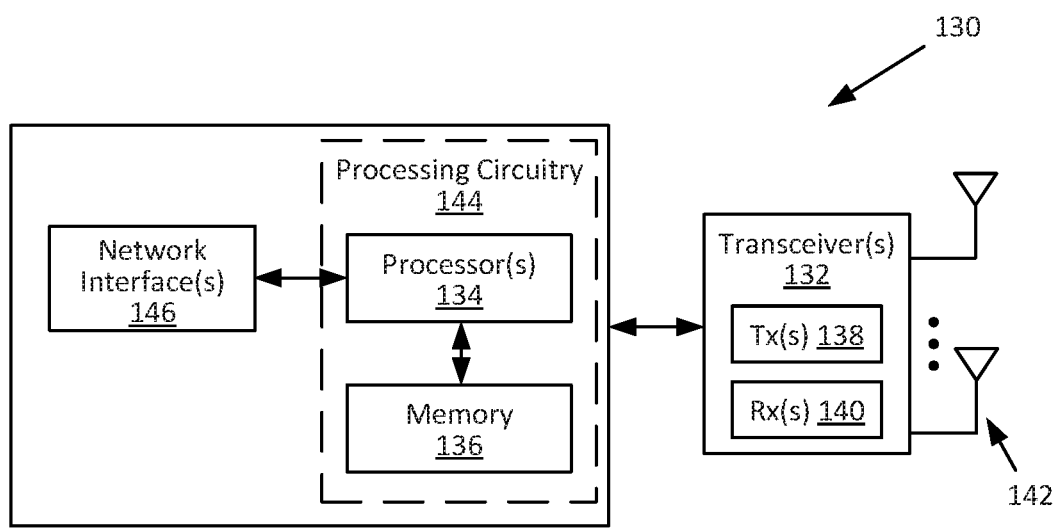
FIG. 9 is a block diagram of a radio network node in accordance with some embodiments.

FIG. 9 is a block diagram of an exemplary radio network node 130, in accordance with certain embodiments. Radio network node 130 may include one or more of a transceiver 132, processor 134, memory 136, and network interface 146. In some embodiments, the transceiver 132 facilitates transmitting wireless signals to and receiving wireless signals from UE 110 (e.g., via transmitter(s) (Tx) 138, receiver(s) (Rx) 140, and antenna(s) 142). The processor 134 executes instructions to provide some or all of the functionalities described above as being provided by a radio network node 130, the memory 136 stores the instructions executed by the processor 134. In some embodiments, the processor 134 and the memory 136 form processing circuitry 144. The network interface 146 communicates signals to backend network components, such as a gateway, switch, router, Internet, Public Switched Telephone Network (PSTN), core network nodes or radio network controllers, etc.

The processor 134 may include any suitable combination of hardware to execute instructions and manipulate data to perform some or all of the described functions of radio network node 130, such as those described above. In some embodiments, the processor 134 may include, for example, one or more computers, one or more central processing units (CPUs), one or more microprocessors, one or more application specific integrated circuits (ASICs), one or more field programmable gate arrays (FPGAs) and/or other logic.

The memory 136 is generally operable to store instructions, such as a computer program, software, an application including one or more of logic, rules, algorithms, code, tables, etc. and/or other instructions capable of being executed by processor 134. Examples of memory 136 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 146 is communicatively coupled to the processor 146 and may refer to any suitable device operable to receive input for radio network node 130, send output from radio network node 130, perform suitable processing of the input or output or both, communicate to other devices, or any combination of the preceding. The network interface 146 may include appropriate hardware (e.g., port, modem, network interface card, etc.) and software, including protocol conversion and data processing capabilities, to communicate through a network.

Other embodiments of radio network node 130 may include additional components beyond those shown in FIG. 9 that may be responsible for providing certain aspects of the radio network node's functionalities, including any of the functionalities described above and/or any additional functionalities (including any functionality necessary to support the embodiment(s) described above). The various different types of network nodes may include components having the same physical hardware but configured (e.g., via programming) to support different radio access technologies, or may represent partly or entirely different physical components.

Figure 10:
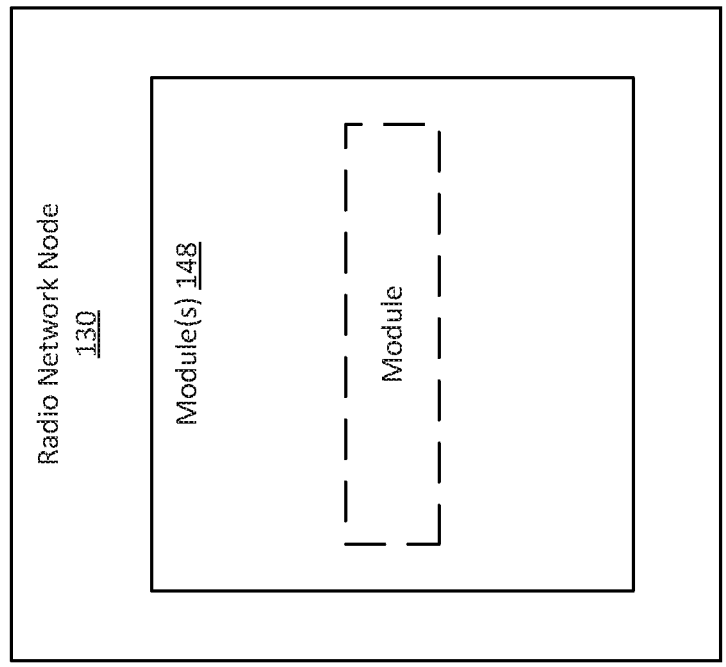
FIG. 10 is another block diagram of a user equipment (UE) in accordance with some embodiments.

Referring to FIG. 10, in some embodiments, the UE 110 may comprise a series of modules configured to implement the functionalities of the UE described above. For instance, in some embodiments, the UE may comprise a (first) determining module configured to determine a need to report measurements to a radio network node within a measurement reporting delay, a (second) determining module configured to determine a need to perform a sounding reference signal, SRS, switching procedure, an extending module configured to extend the measurement reporting delay associated with reporting the measurements to the radio network node in order to allow the UE to perform the SRS switching procedure, and a reporting module configured to report the measurements to the radio network node within the extended measurement reporting delay.

It will be appreciated that the various modules may be implemented as combination of hardware and/or software, for instance, the processor 114, memory 116 and transceiver(s) 112 of UE 110 shown in FIG. 8. Some embodiments may also include additional modules and/or sub-modules to support or implement additional and/or optional functionalities.

Figure 11:
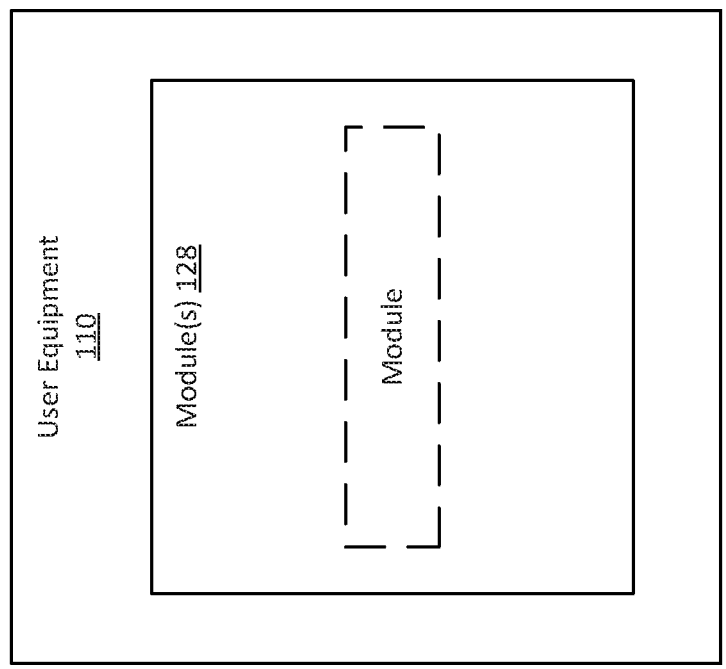
FIG. 11 is another block diagram of a radio network node in accordance with some embodiments.

Referring to FIG. 11, in some embodiments, the radio network node 130 may comprise a series of modules configured to implement the functionalities of the radio network node described above. For instance, in some embodiments, the radio network node may comprise a (first) determining module configured to determine that a UE may need to perform one or more uplink, UL, response transmissions on a first carrier frequency (F1) in a first set of time resources (R1), a (second) determining module configured to determine that the UE may need to perform SRS switching and transmit on at least a second cell (Cell2) operating on a second carrier frequency (F2), a controlling module configured to adaptively control the operations of the UE with SRS switching based on the determined R1, and a processing module configured to use a result of the adaptation for one or more operational tasks.

It will be appreciated that the various modules may be implemented as combination of hardware and/or software, for instance, the processor 134, memory 136 and transceiver(s) 132 of radio network node 130 shown in FIG. 9. Some embodiments may also include additional modules and/or sub-modules to support or implement additional and/or optional functionalities.

Some embodiments may also be represented as a computer program product comprising a non-transitory machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to one or more of the described embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description, which is defined solely by the claims appended hereto.

ABBREVIATIONS

The present description may comprise one or more of the following abbreviation:
3GPP Third Generation Partnership Project
ACK Acknowledged
AGC Automatic gain control
AP Access point
BS Base Station
BSC Base station controller
BTS Base transceiver station
CA Carrier Aggregation
CC Component carrier
CGI Cell Global Identifier
CQI Channel Quality information
CRS Cell-specific Reference Signal
CSI Channel State Information
DAS Distributed antenna system
DC Dual connectivity
DCI Downlink Control Information
DL Downlink
DRX Discontinuous Reception
eNB E-UTRAN NodeB or evolved NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FDM Frequency Division Multiplexing
HD-FDD Half duplex FDD
LBT Listen Before Talk
LTE Long-Term Evolution
M2M Machine to Machine
MAC Medium Access Control
MDT Minimization of Drive Tests
MeNB Master eNodeB
MIB Master Information Block
MME Mobility Management Entity
MPDCCH MTC Physical Downlink Control Channel
MSC Mobile Switching Center
MSR Multi-standard Radio
MTC Machine Type Communication
NACK Not acknowledged
NPBCH Narrowband Physical Broadcast Channel
NPDCCH Narrowband Physical Downlink Control Channel
NR New Radio
O&M Operation and Maintenance
OSS Operations Support System
PBCH Physical Broadcast Channel
PCC Primary Component Carrier
PCell Primary Cell
PCFICH Physical Control Format Indicator Channel
PDCCH Physical Downlink Control Channel
PDSCH Physical Downlink Shared Channel
PHICH Physical HARQ indication channel
PRACH Physical Random Access Channel
PRS Positioning Reference Signal
PSCell Primary SCell
PSS Primary Synchronization Signal
PUCCH Physical Uplink Control Channel
PUSCH Physical Uplink Shared Channel
RACH Random Access Channel RAT Radio Access Technology
RLM Radio Link Management
RRC Radio Resource Control
RRH Remote Radio Head
RRM Radio Resource Management
RRU Remote Radio Unit
RSCP Received Signal Code Power
RSRP Reference Signal Received Power
RSRQ Reference Signal Received Quality
RSSI Received Signal Strength Indicator
RSTD Reference Signal Time Difference
SCC Secondary Component Carrier
SCell Secondary Cell
SeNB Secondary eNodeB
SINR Signal to Interference and Noise Ratio
SNR Signal Noise Ratio
SON Self-organizing Network
SRS Sounding Reference Signal
SSS Secondary synchronization signal
TA Timing Advance
TAG Timing Advance Group
TDD Time Division Duplex
TTI Transmission Time Interval
UE User Equipment
UL Uplink
UMTS Universal Mobile Telecommunication System
UpPTS Uplink Pilot Time Slot
UTRA Universal Terrestrial Radio Access
UTRAN Universal Terrestrial Radio Access Network

What is claimed is:

1. A method in a user equipment, UE, the method comprising:
determining a need to report measurements to a radio network node within a measurement reporting delay;
while within the measurement reporting delay, determining a need to perform a sounding reference signal, SRS, carrier-based switching procedure to transmit SRS on one or more different carriers;
extending the measurement reporting delay associated with reporting the measurements to the radio network node in order to allow the UE to perform and complete the SRS carrier-based switching procedure; and
reporting the measurements to the radio network node within the extended measurement reporting delay.

2. The method as claimed in claim 1, further comprising performing the measurements prior to determining a need to report measurements to a radio network node within a measurement reporting delay.

3. The method as claimed in claim 1, wherein determining a need to report measurements to a radio network node within a measurement reporting delay is based, at least in part, on a measurement configuration or on a measurement reporting configuration.

4. The method as claimed in claim 3, wherein the measurement configuration or the measurement reporting configuration are received from the radio network node.

5. The method as claimed in claim 1, wherein the measurements comprise power measurements.

6. The method as claimed in claim 5, wherein the power measurements comprise received signal strength measurements.

7. The method as claimed in claim 1, wherein the measurements comprise quality measurements.

8. The method as claimed in claim 7, wherein the quality measurements comprise received signal quality measurements.

9. The method as claimed in claim 1, wherein the measurements comprise timing measurements.

10. The method as claimed in claim 9, wherein the timing measurements comprise time of arrival measurements.

11. The method as claimed in claim 1, wherein the measurements are event-triggered measurements.

12. The method as claimed in claim 1, wherein determining a need to perform a SRS carrier-based switching procedure comprises receiving a SRS request message from the radio network node or from another radio network node.

13. A user equipment, UE, comprising processing circuitry, the processing circuitry being configured to:
determine a need to report measurements to a radio network node within a measurement reporting delay;
while within the measurement reporting delay, determine a need to perform a sounding reference signal, SRS, carrier-based switching procedure;
extend the measurement reporting delay associated with reporting the measurements to the radio network node in order to allow the UE to perform and complete the SRS carrier-based switching procedure; and
report the measurements to the radio network node within the extended measurement reporting delay.

14. The UE as claimed in claim 13, wherein the processing circuitry is further configured to perform the measurements prior to determining a need to report measurements to a radio network node within a measurement reporting delay.

15. The UE as claimed in claim 13, wherein determining a need to report measurements to a radio network node within a measurement reporting delay is based, at least in part, on a measurement configuration or on a measurement reporting configuration.

16. The UE as claimed in claim 15, wherein the processing circuitry is further configured to receive the measurement configuration or the measurement reporting configuration from the radio network node.

17. The UE as claimed in claim 13, wherein the measurements comprise power measurements.

18. The UE as claimed in claim 17, wherein the power measurements comprise received signal strength measurements.

19. The UE as claimed in claim 13, wherein the measurements comprise quality measurements.

20. The UE as claimed in claim 19, wherein the quality measurements comprise received signal quality measurements.

21. The UE as claimed in any one of claim 13, wherein the measurements comprise timing measurements.

22. The UE as claimed in claim 21, wherein the timing measurements comprise time of arrival measurements.

23. The UE as claimed in claim 13, wherein the measurements are event-triggered measurements.

24. The UE as claimed in claim 13, wherein when determining a need to perform a SRS carrier-based switching procedure, the processing circuitry is further configured to receive a SRS request message from the radio network node or from another radio network node.

* * * * *